United States Patent
Kolz et al.

(10) Patent No.: US 8,316,013 B2
(45) Date of Patent: Nov. 20, 2012

(54) PROGRAMMATIC RETRIEVAL OF TABULAR DATA WITHIN A CELL OF A QUERY RESULT

(75) Inventors: Daniel Paul Kolz, Rochester, MN (US); Shannon Everett Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 1404 days.

(21) Appl. No.: 11/463,342

(22) Filed: Aug. 9, 2006

(65) Prior Publication Data

US 2008/0040312 A1 Feb. 14, 2008

(51) Int. Cl.
*G06F 7/00* (2006.01)
*G06F 17/30* (2006.01)
(52) U.S. Cl. ........................................................ 707/722
(58) Field of Classification Search .................. 707/3, 6, 707/722

See application file for complete search history.

(56) References Cited

U.S. PATENT DOCUMENTS 5,758,337 A * 5/1998 Hammond ........................ 707/6
6,871,204 B2 * 3/2005 Krishnaprasad et al. ..... 707/102

* cited by examiner

*Primary Examiner* — James Trujillo
*Assistant Examiner* — Jeffrey Chang
(74) *Attorney, Agent, or Firm* — Patterson & Sheridan LLP

(57) ABSTRACT

A method, system and article of manufacture for processing a database query result that includes multiple data elements in a single result field. One embodiment provides a method of processing a query result. The method includes receiving a query result that includes at least one result field having multiple data elements that are in a many-to-one relationship with a second result field. The received query result is parsed to identify the multiple data elements from the first result field. Then, a result set is generated on the basis of the identified multiple data elements. The generated result set only includes one-to-one relationships between different result fields. Advantageously, the generated result set is suitable for programmatic access in order to allow an automated processing of the generated result set.

25 Claims, 4 Drawing Sheets

400

| | FIRST NAME | ID | DIAGNOSIS | DATE |
|---|---|---|---|---|
| 452 → | JAMES | 1 | INFLUENZA | 1/2/2005 |
| 454 → | JAMES | 1 | ULCER | 11/5/2005 |
| 456 → | JAMES | 1 | INFLUENZA | 2/12/2006 |
| 458 → | JAMES | 1 | INFLUENZA | 7/5/2006 |
| 462 → | MARK | 2 | LIVER FAILURE | 1/4/2003 |
| 464 → | LINDSAY | 3 | INFLUENZA | 7/5/2004 |
| 472 → | HENRY | 4 | COMMON COLD | 5/19/2005 |
| 474 → | HENRY | 4 | CANCER | 1/4/2006 |

| | FIRST NAME | ID | DIAGNOSIS |
|---|---|---|---|
| 540 → | JAMES | 1 | INFLUENZA<br>ULCER<br>INFLUENZA<br>INFLUENZA |
| 550 → | HENRY | 4 | COMMON COLD<br>CANCER |

| | ID | DIAGNOSIS |
|---|---|---|
| 642 → | 1 | INFLUENZA |
| 644 → | 1 | ULCER |
| 646 → | 1 | INFLUENZA |
| 648 → | 1 | INFLUENZA |
| 652 → | 4 | COMMON COLD |
| 654 → | 4 | CANCER |

PROGRAMMATIC RETRIEVAL OF TABULAR DATA WITHIN A CELL OF A QUERY RESULT

BACKGROUND OF THE INVENTION

1. Field of the Invention

The present invention generally relates to data processing and, more particularly, to processing database query results.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations. Such operations can be configured to retrieve, add, modify and delete information being stored and managed by the DBMS. Standard database access methods support these operations using high-level query languages, such as the Structured Query Language (SQL). The term "query" refers to a set of words, phrases, or groups of words characterizing the data that a user may want to retrieve from a database.

Any requesting entity, including applications, operating systems and, at the highest level, users, can issue queries against data in a database to obtain required information. Queries may be predefined (i.e., hard coded as part of an application) or generated in response to input (e.g., user input). After a query is executed, a query result is returned to the requesting entity. The requesting entity may wish to invoke further routines to analyze the data included in the query result.

However, query results are typically returned in a format useful for presenting and displaying the results to a user. For example, query results are often returned as an HTML or XML document, or even more simply, a text-file of comma separated values. In this format, markup tags may be used to render a display of the query result as a table with the one or more rows. In some cases, a given cell of such a table may itself include multiple data elements. For instance, a cell of a row of such a result table may include multiple data elements or values. Within such a row, data from one cell may have a one-to-many relationship with data elements in the cell that contains multiple data elements. Further, if multiple cells within a row contain multiple elements many-to-many relationships may exist for elements in such a row. However, when returned in as an HTML or XML document, (among other formats), the query results are not returned in manner that preserves the relational nature of the query results. For example, elements from multiple database rows may be formatted and displayed as a single text string in a single row of a result table. Thus, the referential integrity of the data is lost. This referential integrity, however, is required for programmatic access by routines configured to analyze the data from the table. Accordingly, the referential integrity needs to be recreated to allow such a programmatic access.

Therefore, there is a need for an efficient technique for providing programmatic access and retrieval of relational data within a result set where cells may include elements from multiple database rows.

SUMMARY OF THE INVENTION

The present invention is generally directed to a method, system and article of manufacture for processing database query results and, more particularly, for processing of query results having multiple data elements in a single result field.

One embodiment of the invention includes a computer-implemented method of processing a query result. The method generally includes receiving the query result, wherein the query result includes a first result field having multiple data elements in a many-to-one relationship with a second result field and parsing the received query result to identify the multiple data elements from the first result field. The method generally further includes generating a result set from the identified multiple data elements, wherein the generated result set includes one or more rows, each row including a one-to-one relationship between one of the multiple data elements of the first result field and the second result field and returning the generated result set.

Another embodiment of the invention includes a computer-readable medium containing a program which, when executed by a processor, performs operations for processing a query result. The operations may generally include receiving the query result, wherein the query result includes a first result field having multiple data elements in a many-to-one relationship with a second result field and parsing the received query result to identify the multiple data elements from the first result field. The operations may generally further include generating a result set from the identified multiple data elements, wherein the generated result set includes one or more rows, each row including a one-to-one relationship between one of the multiple data elements of the first result field and the second result field and returning the generated result set.

Another embodiment of the invention includes a computing device having a processor and a memory containing a program for processing a query result. The program may be configured to perform an operation for generating a result set from data included with a result field of a query result. The operation may generally include receiving the query result, wherein the query result includes a first result field having multiple data elements in a many-to-one relationship with a second result field and parsing the received query result to identify the multiple data elements from the first result field. The operation may generally further include generating a result set from the identified multiple data elements, wherein the generated result set includes one or more rows, each row including a one-to-one relationship between one of the multiple data elements of the first result field and the second result field and returning the generated result set.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

Note, however, that the appended drawings illustrate only typical embodiments of this invention and are therefore not to be considered limiting of its scope, for the invention may admit to other equally effective embodiments.

FIG. 4 is an exemplary database table;

FIG. 5 is an exemplary query result obtained from the database table of FIG. 4; and FIG. 6 is the query result of FIG. 5 after processing according to one embodiment of the invention.

DETAILED DESCRIPTION OF THE PREFERRED EMBODIMENTS

Introduction

Figure 1:
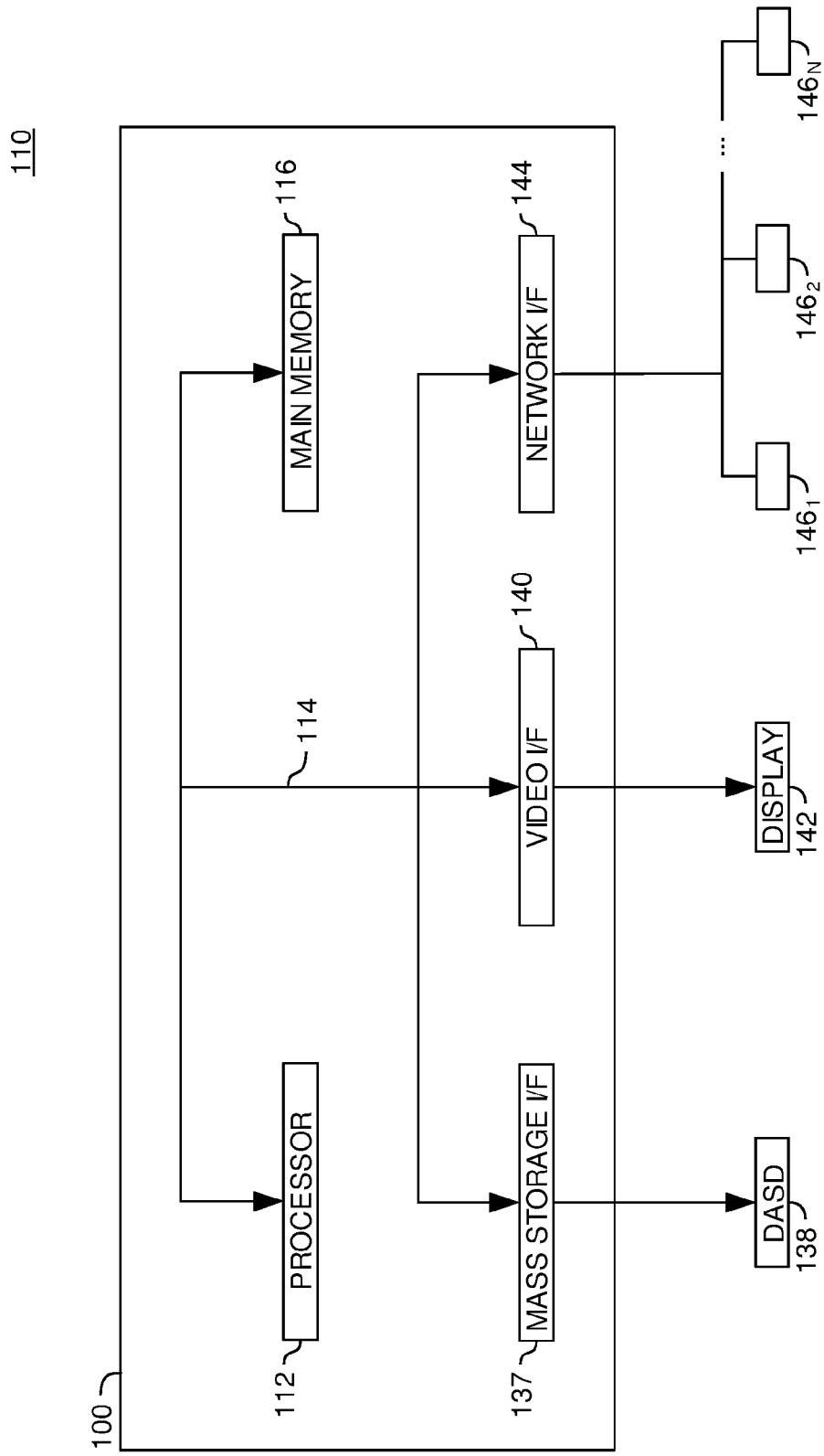
FIG. 1 illustrates a computer system that may be used in accordance with the invention.

The present invention is generally directed to a method, system and article of manufacture for processing database query results and, more particularly, for processing database query results having multiple data elements stored in a single result field. In general, queries are executed against one or more underlying databases. Typically, a database query includes one or more result fields specifying what data elements should be returned in a result set. A query also typically specifies conditions used to evaluate whether a given element of data should be included in the result set. The result set includes the one or more result fields, each having data retrieved from the underlying database for the result field that satisfies any conditions specified in the query.

In one embodiment, an underlying result set may be returned in a tabular form having one or more rows and one or more columns defining a plurality of result fields. At least one result field of a given row may itself include data in tabular form. In other words, the one result field may include multiple data elements or values. The multiple data elements may have a many-to-one relationship with other elements in the given row. For example, consider a query related to the medical diagnosis related to a given patient. In a result table with data for many patients, each patient's data may be listed in a single row, and a field in each row may list multiple diagnoses for that patient.

According to one embodiment of the invention, the multiple data elements are retrieved from the at least one result field and used to generate a separate result set. The generated result set may have a separate result field for each of the identified multiple data elements, each separate result field having a one-to-one relationship to the given row. In one embodiment, the generated result set is suitable for programmatic access by analysis routines to allow automated processing of the generated result set.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system. The program(s) of the program product defines functions of the embodiments (including the methods described herein) and can be contained on a variety of computer-readable media. Illustrative computer-readable media include, but not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

FIG. 1 illustrates a computer system 100 that may be used in accordance with embodiments of the invention. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention.

Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. As used herein, the term "computer" shall mean any computerized device having at least one processor. The computer 100 may be a standalone device or part of a network in which case the computer may be coupled by communication means (e.g., a local area network or a wide area network) to another device (i.e., another computer).

In any case, one of ordinary skill in the art will understand that FIG. 1 is merely one configuration for a computer system. Embodiments of the invention can apply to any comparable configuration, regardless of whether the computer 100 is a complicated multi-user apparatus, a single-user workstation, or a network appliance that does not have non-volatile storage of its own.

The computer 100 may include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network. Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention.

The main memory 116 is any memory sufficiently large to hold the necessary programs and data structures. Main memory 116 could be one or a combination of memory devices, including random access memory, nonvolatile or backup memory, (e.g., programmable or flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

An Exemplary Database and Query Environment

Figure 2:
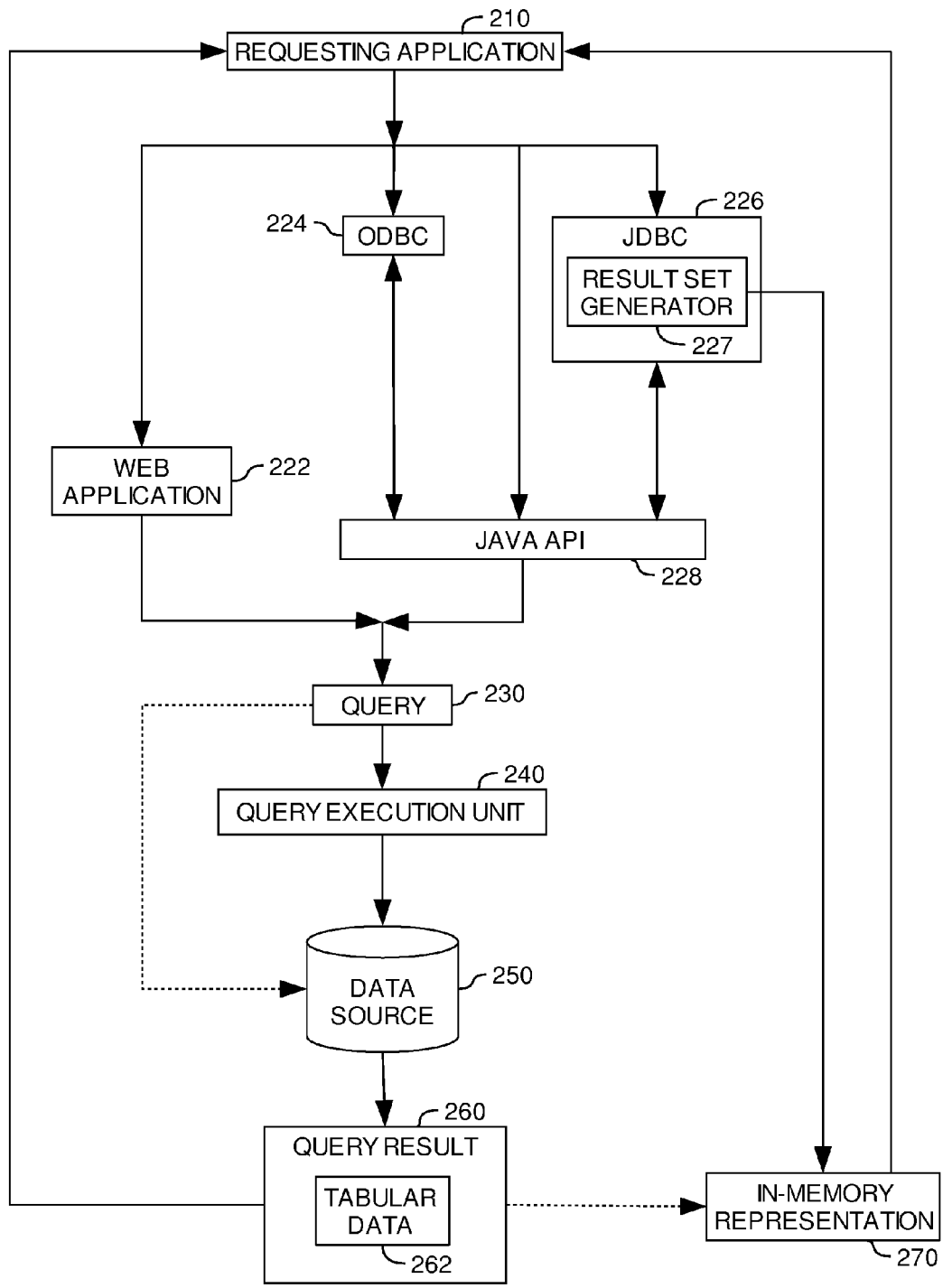
FIG. 2 is a relational view of software components used to create and execute database queries and to process query results, according to one embodiment of the invention.

FIG. 2 illustrates a relational view of software components, according to one embodiment of the invention. As shown, the software components include a requesting application 210, a plurality of database connectivity tools 222, 224, 226 and 228, a query execution unit 240, and one or more data sources 250 (only a single data source is illustrated, for simplicity).

Requesting application 210 is representative of any application, including an operating system, configured to issue queries against the data source 250. The queries issued by the application 210 may be predefined (i.e., hard coded as part of the application 210) or may be generated in response to input (e.g., user input). In one embodiment, users may compose a query by interacting with a user interface provided by the application 210 For example a graphical user interface may be configured to allow a user to create/submit queries.

Furthermore, in one embodiment, the requesting application 210 may be configured to programmatically access query results for processing. More specifically, the requesting application 210 may process a query result using routines or transmit the given query result to one or more other applications configured to process data returned in a query result.

Illustratively, the requesting application 210 issues a query 230 against the data source 250 (illustrated by a dashed arrow) to obtain a query result 260. To this end, the requesting application 210 accesses one of the database connectivity tools 222, 224, 226, or 228 for accessing data source 250. Illustratively, the database connectivity tools 222, 224, 226, and 228 include a Web application 222, an open Database connectivity (ODBC) driver 224, a Java® Database connectivity (JDBC) driver 226 and a Java® application programming interface (Java API) 228.

Web application 222 is an application that is accessible by a Web browser and that provides functions beyond simply the static display of information. For example, web application 222 allows the requesting application 210 to query the data source(s) 250. The ODBC driver 224 provides a set of standard application programming interfaces to perform database functions such as connecting to the data source 250, executing SQL functions, and committing or rolling back database transactions. JDBC driver 226 is an API for the Java® programming language defining how a client may access a database. JDBC driver 226 provides methods for querying and updating data in a database.

Illustratively, the JDBC driver 226 includes a result set generator 227 that is configured to create an in-memory representation 270 of the query result 260, as described in more detail below. In one embodiment, result set generator 227 may be implemented as a method call that returns a programmatic Java® ResultSet or RowSet object (or a reference to such an object) defining the in-memory representation 270. Note however, that other possible implementations, known or unknown, are broadly contemplated. Java API 228 provides methods that allow an application program (e.g., requesting application 210, ODBC 224 or JDBC 226) written in a high-level language to use specific data or functions or interfaces provided by API 228.

Illustratively, issued query 230 is executed by the query execution unit 240 against the data source 250. For instance, the query 230 is executed against a data table maintained in the data source 250. An exemplary data table is described in more detail below with reference to FIG. 4.

It should be noted that the query execution unit 240 is shown as a single component, for simplicity. However, the query execution unit 240 may include other components, such as a query engine, a query parser and a query optimizer. A query parser is generally configured to accept a received query input from a requesting entity, such as the requesting application 210, and then parse the received query. The query parser may then forward the parsed query to the query optimizer for optimization. A query optimizer is an application program which is configured to construct a near optimal search strategy (known as an "access plan") for a given set of search parameters, according to known characteristics of an underlying database (e.g., the data source 250), an underlying system on which the search strategy will be executed (e.g., computer system 110 of FIG. 1), and/or optional user specified optimization goals. But not all strategies are equal and various factors may affect the choice of an optimum search strategy. However, in general such search strategies merely determine an optimized use of available hardware/software components to execute respective queries. Once an access plan is selected, the query engine may then execute the query according to the selected access plan.

When query 230 is executed against the data source 250, the query result 260 may be returned to the requesting application 210. In some cases, the query result 260 may be formatted and displayed in a tabular form having one or more rows and one or more columns defining distinct result fields. For instance, the query result may be returned as a text format, such as an HTML or XML document, or a text file of comma separated values. The markup tags in such a document may define how to render and display the results of the query arranged in a tabular display. An exemplary tabular query result is described in more detail below with reference to FIG. 5

In one embodiment, the tabular query result 260 may include a row that has a result field having tabular data 262. That is, a row may include a result field that itself includes multiple data elements. The tabular data 262 may have a many-to-one relationship with other data in that row. However, the tabular data 262 may be represented as a text string in the text-based form (e.g., an HTML document). Thus, the query result 260 may not be suitable for programmatic access by other routines of application 210.

In one embodiment, result set generator 227 may be invoked to provide an in-memory representation of the query result 260 that may be used for programmatic access to the query results. For example, the result set generator 227 may access the query result 260 and identify the multiple data elements within a given cell of result 260. The result set generator 227 then generates the in-memory representation 270 on the basis of the identified multiple data elements. For example, the in-memory representation 270 may define a separate result table having a separate result field in a separate row for each of the identified multiple data elements. To establish referential integrity, each row may include a reference to the corresponding primary key of the row that in the query result 260.

By way of example, the separate result table may be a relational table in the form of a Java® ResultSet or RowSet object which is suitable for programmatic access by corresponding analysis routines provided by API 228. As is known, a RowSet is an instance of a Java® RowSet class which in turn is part of a RowSet framework provided by the Java® programming language. The JDBC driver implementation provides the ability to query one or more databases. The results of the query can be accessed with an implementation of RowSet interface which provides access to rows of data forming a query result. The rowset can be stored as a persistent data object. Thus, the rowset can be accessed and modified as required independent of the one or more databases. For example, method calls may be used to access data from a specific row and column, or to iterate over values from an entire row, column, or the complete RowSet. Subsequently, the modified rowset and the one or more databases can be synchronized to reflect the modifications performed on the rowset in the one or more databases.

The in-memory representation 270 is returned to the requesting application 210. Thus, the query result 260 can be accessed and processed programmatically by the requesting application 210 using the in-memory representation 270, even though the original query result may be in a presentation and/or display formant (e.g., an XML or HTML document).

Creating an in-Memory Representation from a Query Result

Figure 3:
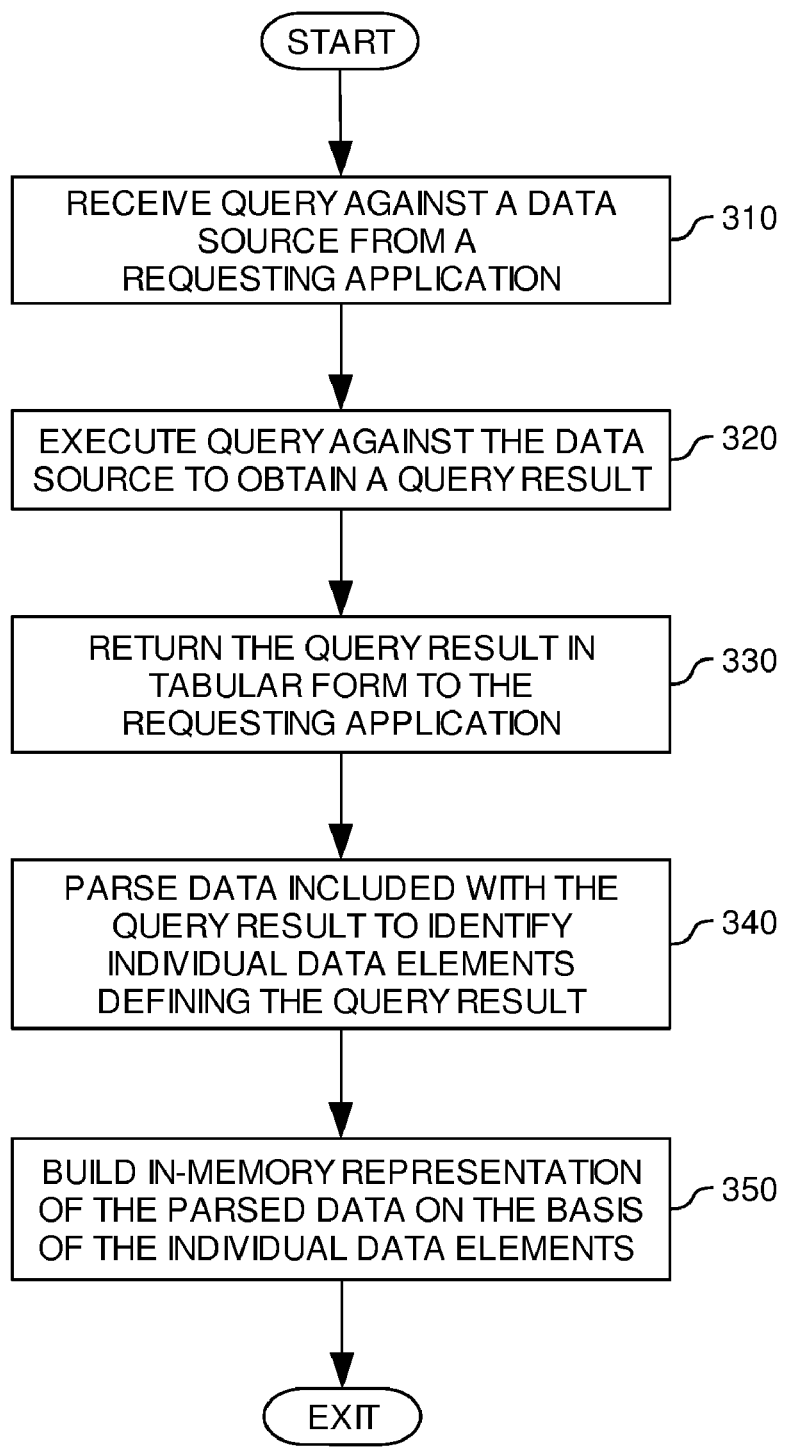
FIG. 3 is a flow chart illustrating a method for processing a query result, according to one embodiment of the invention.

FIG. 3 illustrates one embodiment of a method 300 for generating an in-memory representation (e.g., in-memory representation 270 of FIG. 2) from a query result (e.g., query result 260 of FIG. 2). According to one aspect, the query result is obtained in response to execution of a query (e.g., query 230 of FIG. 2) against an underlying data source (e.g., data source 250 of FIG. 2). In one embodiment, the method 300 is performed by the query execution unit 240 and the result set generator 227 of FIG. 2.

Method 300 starts at step 310, where a query against an underlying data source is received from a requesting application (e.g., requesting application 210 of FIG. 2). For example, Table I shows an exemplary query composed in natural language.

TABLE I

QUERY EXAMPLE

| 001 | FIND |
| 002 | First Name, ID, Diagnosis |
| 003 | FROM |
| 004 | Diagnosis-Information |
| 005 | WHERE |
| 006 | Date >= Jan. 1, 2005 |

As shown, the query example includes three result fields (line 002) and is configured to retrieve first names ("First Name" in line 002), patient identifiers ("ID" in line 002) and diagnosis information ("Diagnosis" in line 002). Assume for this example that the query is to be used to retrieve records from a database storing information regarding patients treated at a medical institution. Each patient is identified by an associated patient identifier ("ID" in line 002). The requested information is retrieved from a table named "Diagnosis-Information" (line 004) in the underlying data source. Further, only records for patients having had a diagnosis on or after Jan. 1 st, 2005 ("Date>=1/1/2005" in line 006) should be returned.

At step 320, the query received at step 310 may be executed to obtain a query result. For example, the query of Table I may be executed against data in the "Diagnosis-Information" illustrated in Table II below.

TABLE II

DIAGNOSIS-INFORMATION TABLE EXAMPLE

| 001 | First Name | ID | Diagnosis | Date |
|---|---|---|---|---|
| 002 | Mark | 2 | Liver Failure | Jan. 4, 2003 |
| 003 | Lindsay | 3 | Influenza | Jul. 5, 2004 |
| 004 | James | 1 | Influenza | Jan. 2, 2005 |
| 005 | Henry | 4 | Common Cold | May 19, 2005 |
| 006 | James | 1 | Ulcer | Nov. 5, 2005 |
| 007 | Henry | 4 | Cancer | Jan. 4, 2006 |
| 008 | James | 1 | Influenza | Feb. 12, 2006 |
| 009 | James | 1 | Influenza | Jul. 5, 2006 |

As shown, the "Diagnosis-Information" table includes four columns: "First Name", "ID", "Diagnosis" and "Date" (line 001) and eight rows (lines 002-009). By way of example, assume that the "ID" column is used as a primary key to associate each of the rows in lines 002-009 with a particular patient. Illustratively, the rows in lines 002-009 are ordered with respect to the diagnosis dates in the "Date" column. Accordingly, a chronological order of the diagnoses for the patients "Mark" (line 002), "Lindsay" (line 003), "James" (lines 004, 006, 008 and 009) and "Henry" (lines 005 and 007) is established in Table II. Note, "Influenza" was diagnosed four times, once for "Lindsay" (line 003) and three times for "James" (lines 004, 008 and 009). The exemplary "Diagnosis-Information" table is further described below with reference to FIG. 4.

In response to executing the query from Table I, the query result shown in Table III below may be obtained. In one embodiment, the query result may be formatted and represented in tabular form.

TABLE III

QUERY RESULT EXAMPLE

| 001 | First Name | ID | Diagnosis |
|---|---|---|---|
| 002 | James | 1 | Influenza, Ulcer, Influenza, Influenza |
| 003 | Henry | 4 | Common Cold, Cancer |

As shown, the query result includes two rows (lines 002-003) and three columns: "First Name", "ID", and "Diagnosis" (line 001) (as requested in line 002 of the query of Table I). As can be seen from Table III, the "Diagnosis" column includes four data elements for the patient "James" (line 002); namely, values of "Influenza", "Ulcer", "Influenza" and "Influenza," and two data elements for the patient "Henry" (line 003); namely, i.e., values of "Common Cold" and "Cancer." The exemplary result table is further described below with reference to FIG. 5.

Assume now, that a researcher wants to use the exemplary query result of Table III in order to determine programmatically how many patients have had an "Influenza" diagnosis. However, the referential integrity of the exemplary "Diagnosis-Information" table is lost in the result table shown in Table III, as the values in the "Diagnosis" result field are in a many-to-one relationship to the corresponding rows. Thus, an analysis routine that counts the number of "Influenza" diagnoses would incorrectly return a diagnosis count of three. However, actually only one patient has had "Influenza" diagnoses.

To this end, the data included with the query result is parsed to identify result fields having more than a single data element. In the given example, the result table may be parsed and to determine that the "Diagnosis" result field contains multiple data elements, i.e., multiple values or expressions, in rows 002-003 of Table III. At step 350, an in-memory representation may be generated on the basis of the determined multiple data elements. For example, Table IV illustrates an exemplary in-memory representation generated from the exemplary query result of Table III.

TABLE IV

GENERATED RESULT TABLE EXAMPLE

| 001 | ID | Diagnosis |
|---|---|---|
| 002 | 1 | Influenza |
| 003 | 1 | Ulcer |
| 004 | 1 | Influenza |
| 005 | 1 | Influenza |
| 006 | 4 | Common Cold |
| 007 | 4 | Cancer |

As shown, the exemplary in-memory representation includes six rows (lines 002-007), each having two columns: "ID" and "Diagnosis" (line 001). As can be seen from Table IV, a separate row was generated for each data element included with the "Diagnosis" column in lines 002 and 003 of Table III. Accordingly, each of the data elements included in separate rows in lines 002-007 of Table IV is now in a one-to-one relationship with the corresponding row. Furthermore, each row was associated with the primary key of the corresponding row in the exemplary query result of Table III, i.e., the corresponding "ID" value. The exemplary in-memory representation is further described below with reference to FIG. 6.

The generated in-memory representation is returned to the requesting application. The requesting application may then programmatically access the query result using the in-memory representation for further processing. For example, a routine (e.g., a method of API 228) may be invoked to iterate over the rows in Table IV. Accordingly, the analysis routine can ignore or remove the duplicates and determine as result for the researcher's request that only a single patient has had an "Influenza" diagnosis.

FIG. 4 shows an exemplary database table 400 that illustrates a representation of the exemplary "Diagnosis-Information" table. The table 400 illustratively includes a "First Name" column 410, an "ID" column 420, a "Diagnosis" column 430 and a "Date" column 440 having data included with eight different rows 452, 454, 456, 458, 462, 464, 472 and 474.

In contrast to the exemplary "Diagnosis-Information" table of Table II above, the rows 452, 454, 456, 458, 462, 464, 472 and 474 of table 400 are illustratively ordered in ascending order with respect to patient identifier values included with the "ID" column 420. In the given example, row 452 corresponds to line 004, row 454 to line 006, rows 456 and 458 to lines 008-009, rows 462 and 464 to lines 002-003 and rows 472-474 to lines 005 and 007 of the exemplary table of Table II.

FIG. 5 shows an exemplary query result 500 (e.g., query result 260 of FIG. 2) that illustrates both the formatting and representation of the exemplary query result of Table III above, in tabular form. For example, the query result 500 may be rendered according to a set of HTML markup tags to provide the tabular structure shown in FIG. 5. Illustratively, the query result 500 includes a "First Name" column 510 that contains data from the "First Name" column 410 from table 400. Query result 500 also includes an "ID" column 520 having data from the "ID" column 420 from table 400. Finally, query result 500 includes a "Diagnosis" column 530 having data from the "Diagnosis" column 430 of table 400.

As can be seen from FIG. 5, the exemplary query result 500 only includes two rows 540 and 550. However, as was noted above, the "Diagnosis" result field of the row 540 referring to "James" includes four data elements: "Influenza", "Ulcer", "Influenza" and "Influenza". Similarly, the "Diagnosis" result field of the row 550 that referring to "Henry" includes two data elements: "Common Cold" and "Cancer".

FIG. 6 shows an exemplary in-memory representation 600 (e.g., in-memory representation 270 of FIG. 2) that illustrates a separate result table generated from the data of a query result (e.g., tabular data 262 of FIG. 2). Illustratively, the result table 600 includes a "Diagnosis" column 620 having data from the "Diagnosis" column 530 of query result 500.

As can be seen from FIG. 6, table 600 includes a separate row for each of the multiple data elements included in the "Diagnosis" column of rows 540 and 550 of table 500. Accordingly, for a "Diagnosis" column 620, rows 642-648 were generated from row 540 of query result table 500, and rows 652-654 were generated from row 550 of table 500. Additionally, the value of the "ID" column 520 was included with each of the rows 642-654 in an "ID" column 610. Thus, referential integrity from the exemplary table 400 of FIG. 4 was recreated in the separate result table 600 of FIG. 6.

Advantageously, embodiments of the invention allow for the creation of a relational data structure from a query result. Once a query result is obtained, the query result may be used to generate the relational data structure which may thereafter be used to provide programmatic access to the query result. Thus, any analysis or other data processing routine may be used to process data from the query result.

While the foregoing is directed to embodiments of the present invention, other and further embodiments of the invention may be devised without departing from the basic scope thereof, and the scope thereof is determined by the claims that follow.

What is claimed is:

1. A computer-implemented method of processing a query result, comprising:
  receiving the query result, wherein the query result includes a first result field having multiple data elements in a many-to-one relationship with a second result field, and wherein the query result is formatted for display on a display device in a tabular format having at least one row that includes the first and second result fields;

parsing the received query result to identify the multiple data elements from the first result field;

generating a result set from the identified multiple data elements, wherein the generated result set includes one or more rows, each row including a one-to-one relationship between one of the multiple data elements of the first result field and the second result field; and returning the generated result set.

2. The method of claim 1, further comprising:

passing the returned result set to a programmatic routine for further processing of the query result.

3. The method of claim 1, wherein the received query result is defined in a tabular form having at least one row that includes the first and second result fields.

4. The method of claim 3, wherein the many-to-one relationship exists between the multiple data elements in the first result field and a primary key of the at least one row.

5. The method of claim 1, wherein the query result field received as one of an XML document, an HTML document, and a text-file containing comma separated values.

6. The method of claim 1, wherein generating the result set comprises:

generating a separate result field for each of the identified multiple data elements.

7. The method of claim 6, wherein generating the result set comprises:

generating an in-memory representation of the query result, the in-memory representation having a plurality of rows, including a separate row for each of the multiple data elements of the first field.

8. The method of claim 7, wherein the in-memory representation is an instance of a Java® RowSet object.

9. The method of claim 1, wherein the received query result is parsed and the result set is generated for access by methods of an application programming interface (API).

10. The method of claim 9, wherein the API is one of a JDBC API and an ODBC API.

11. A computer-readable storage medium containing a program which, when executed by a processor, performs operations for processing a query result, the operations comprising:

receiving the query result, wherein the query result includes a first result field having multiple data elements in a many-to-one relationship with a second result field, and wherein the query result is formatted for display on a display device in a tabular format having at least one row that includes the first and second result fields;

parsing the received query result to identify the multiple data elements from the first result field;

generating a result set from the identified multiple data elements, wherein the generated result set includes one or more rows, each row including a one-to-one relationship between one of the multiple data elements of the first result field and the second result field; and returning the generated result set.

12. The computer-readable storage medium of claim 11, wherein the operations further comprise passing the returned result set to a programmatic routine for further processing of the query result.

13. The computer-readable storage medium of claim 11, wherein the received query result is defined in a tabular form having at least one row that includes the first and second result fields.

14. The computer-readable storage medium of claim 13, wherein the many-to-one relationship exists between the multiple data elements in the first result field and a primary key of the at least one row.

15. The computer-readable storage medium of claim 11, wherein the query result field received as one of an XML document, an HTML document, and a text-file containing comma separated values.

16. The computer-readable storage medium of claim 11, wherein generating the result set comprises:

generating a separate result field for each of the identified multiple data elements.

17. The computer-readable storage medium of claim 6, wherein generating the result set comprises:

generating an in-memory representation of the query result, the in-memory representation having a plurality of rows, including a separate row for each of the multiple data elements of the first field.

18. The computer-readable storage medium of claim 17, wherein the in-memory representation is an instance of a Java® RowSet object.

19. The computer-readable storage medium of claim 11, wherein the received query result is parsed and the result set is generated for access by methods of an application programming interface (API).

20. The computer-readable storage medium of claim 19, wherein the API is one of a JDBC API and an ODBC API.

21. A computing device, comprising:

a processor; and a memory containing a program for processing a query result, which, when executed, performs an operation for generating a result set from data included with a result field of a query result, comprising:

receiving the query result, wherein the query result includes a first result field having multiple data elements in a many-to-one relationship with a second result field, and wherein the query result is formatted for display on a display device in a tabular format having at least one row that includes the first and second result fields, parsing the received query result to identify the multiple data elements from the first result field, generating a result set from the identified multiple data elements, wherein the generated result set includes one or more rows, each row including a one-to-one relationship between one of the multiple data elements of the first result field and the second result field, and returning the generated result set.

22. The computing device of claim 21, wherein the operations further comprise passing the returned result set to a programmatic routine for further processing of the query result.

23. The computing device of claim 21, wherein the received query result is defined in a tabular form having at least one row that includes the first and second result fields.

24. The computing device of claim 21, wherein generating the result set comprises generating an in-memory representation of the query result, the in-memory representation having a plurality of rows, including a separate row for each of the multiple data elements of the first field.

25. The computing device of claim 24, wherein the in-memory representation is an instance of a Java® RowSet object.

* * * * *